July 10, 1928.

J. TOMAN

VELOCIPEDE

Filed Jan. 5, 1927

1,677,061

James Toman
INVENTOR

BY Victor J. Evans
ATTORNEY

WITNESS:

Patented July 10, 1928.  1,677,061

UNITED STATES PATENT OFFICE.

JAMES TOMAN, OF CHICAGO, ILLINOIS.

VELOCIPEDE.

Application filed January 5, 1927. Serial No. 159,168.

This invention relates to certain novel improvements in velocipedes and has for its principal object the provision of an improved construction of this character which will be highly efficient in use and economical in manufacture.

Among the several objects of the invention is to provide a velocipede having a novel assembly of parts for propelling the same.

A still further object of the invention is to provide a velocipede which is propelled by the weight of a body thereon.

Other objects will appear hereinafter.

The invention consists in the novel combination and arrangement of parts to be hereinafter described and claimed.

The invention will be best understood by reference to the accompanying drawings, showing the preferred form of construction and in which.

Figure 1:
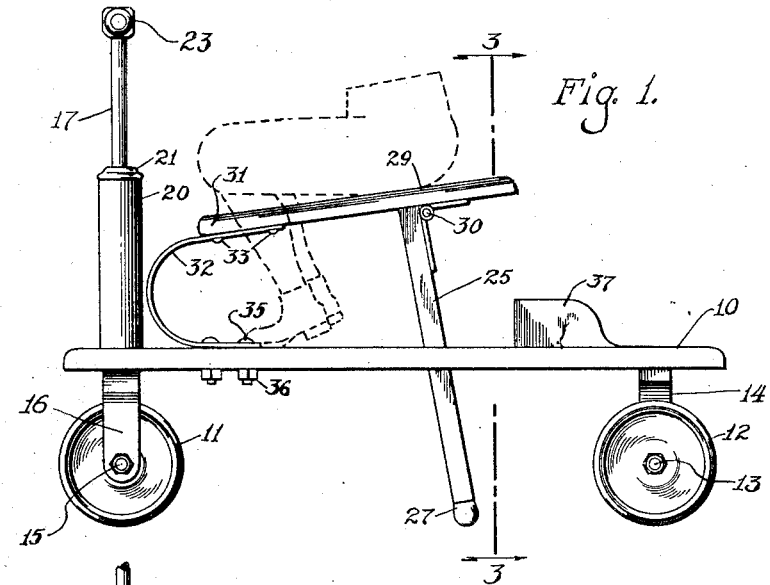
Fig. 1 is a typical side elevational view of the invention.

In the drawing, 10 indicates a body platform supported for traction by wheels 11 and 12. The wheel 12 is carried by an axle 13 secured to a bolster 14 supporting the rear end portion of the body 10. The wheel 11 is carried by an axle 15 supported by a steering fork 16. This fork 16 is formed substantially U-shaped and has connection with a steering post 17 as at 18. This post 17 projects upwardly through an opening 19 formed in the platform 10 at its forward end portion. The post 17 is journaled in a sleeve 20 secured in any suitable manner to the platform 10 at its forward end portion. The post 17 is supported in journaled position within the sleeve 20 through the medium of a collar 21 secured to the post 17 by a set screw 22. The upper end portion of the post has secured thereto a handle bar 23 which facilitates the operator to turn the wheel 11 to guide the platform during traction.

Figure 2:
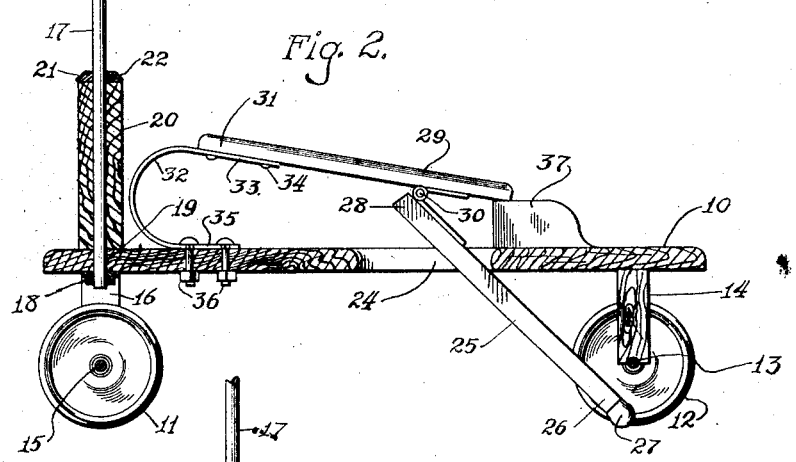
Fig. 2 is a longitudinal sectional detail view of the invention.
Figure 3:
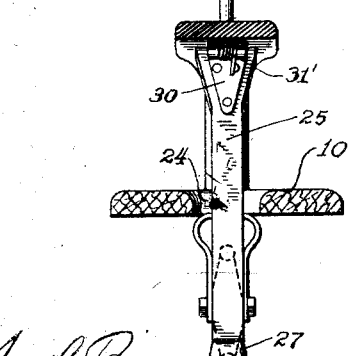
Fig. 3 is a sectional detail view of the invention taken substantially on line 3—3 of Fig. 1.

Formed in the platform 10 intermediate its end portions is an elongated slot 24 and working in this slot 24 is a propelling bar 25. The lower end portion 26 of the propelling bar 25 has secured thereto in any suitable manner, a rubber knob 27 for reasons hereinafter set forth. The upper end portion 28 of the bar 25 is hingedly connected to a seat 29 through the medium of a hinge structure 30. This hinge structure 30 is of the spring type and the spring 31 thereof normally functions to return the bar 25 to the position illustrated in Fig. 1. The seat 29 has its forward end portion 31 connected to the platform 10 through the medium of a resilient strip 32. This strip 32 is bent substantially U-shaped and has its end portion 33 connected to the forward end portion of the seat as at 34. The opposite limb portion 35 of the strip 32 is secured to the forward end portion of the platform as at 36. The strip 32, due to its resilient properties, functions to elevate the seat 29 from the position illustrated in Fig. 2 to the position illustrated in Fig. 1. Downward movement of the seat 29, in a manner hereinafter set forth, is limited by a stop block 37 secured to the rearward portion of the platform 10.

In use the child positions himself on the seat 29 with his feet resting upon the platform 10. The child supports himself so as to permit the strip 32 to place the seat 29 in the position illustrated in Fig. 1. In this position of the seat 29, the bar 25 will be urged into the position illustrated in Fig. 1 through the medium of the spring 31. The child in this position places his hands on the handle bar 23 to guide the velocipede when tractioned. To propel the velocipede the child lets his full weight rest upon the seat 29 and this weight will force the seat 29 downwardly and during this downward movement the rubber knob 27 will bear against the surface over which the velocipede is to be tractioned. Due to the inclined relation between the bar 25 and the seat 29 the downward movement of the seat by the weight of the body will bear upon the propeller bar 25 and inasmuch as the rubber knob prevents the propeller bar 25 from movement independently of the velocipede, this downward movement of the seat 29 will act upon the bar 25 to propel the velocipede in a forward direction. This operation is repeated by the child raising his body from the seat to permit the seat and propeller bar to return to their positions, illustrated in Fig. 1. Continuation of this operation will propel the velocipede about.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In a velocipede, a wheel bearing platform, a seat member, a resilient strap operatively connecting the seat member to the platform and normally supporting the seat member from said platform and functioning to permit movement of the seat member relatively to said platform, a propeller member, and a spring hinge operatively connecting the propeller member to the seat member, said propeller member being operable by movement of the seat member relative to the platform for propelling said platform.

2. In a velocipede, a wheel bearing platform, a seat member, a resilient strap operatively connecting the seat member to said platform and normally supporting the seat member from the platform and functioning to permit movement of the seat member relatively to said platform, a propeller member, a rubber knob carried by the surface engaging an end of the propeller member, and a spring hinge operatively connecting the propeller member to the seat member, said propeller member being operable by movement of the seat member relative to the platform for propelling said platform.

3. In a velocipede, a wheel bearing platform having an elongated slot formed therein, a seat member, a substantially U shaped resilient strip operatively connecting the seat member to the platform and normally supporting the seat member for movement relative to the said platform, a propeller bar operable in the slot and normally extending substantially at an inclination with respect to the platform, and a spring hinge operatively connecting the upper end portion of the propeller bar to the seat member.

In testimony whereof I affix my signature.

JAMES TOMAN.